Oct. 17, 1967  L. E. ELVER  3,347,733
APPARATUS FOR PRODUCING CONTAINERS
Filed April 20, 1964
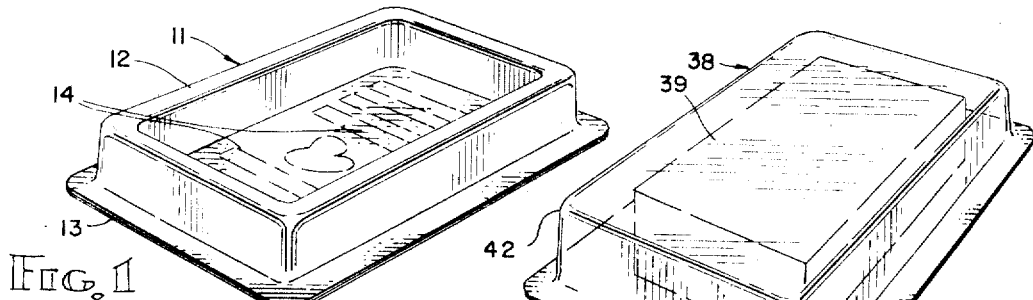
Fig. 1
Fig. 4
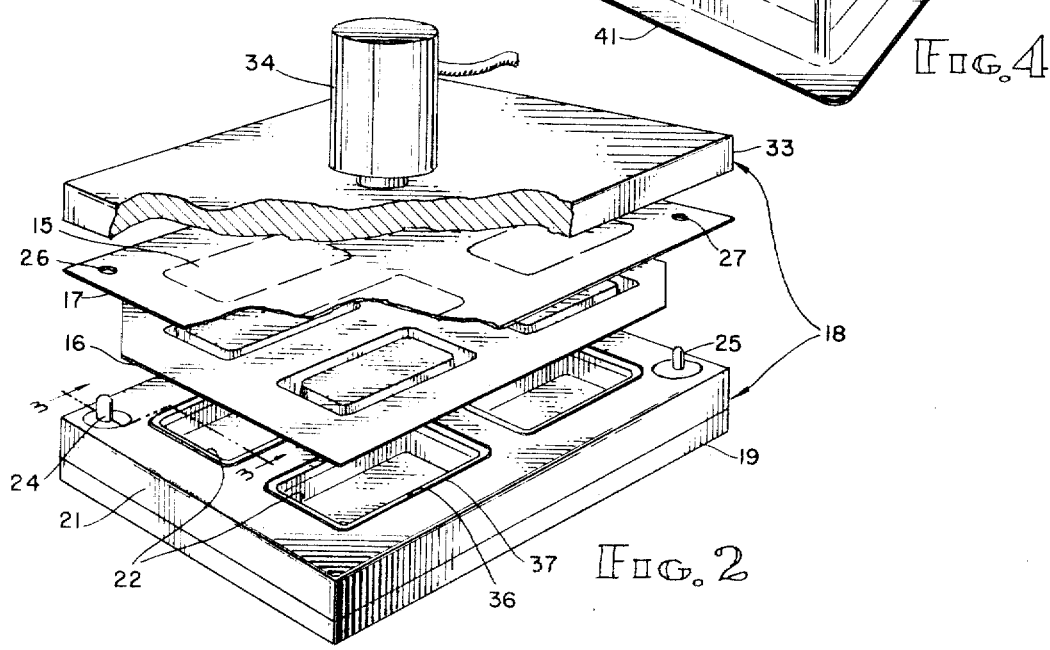
Fig. 2
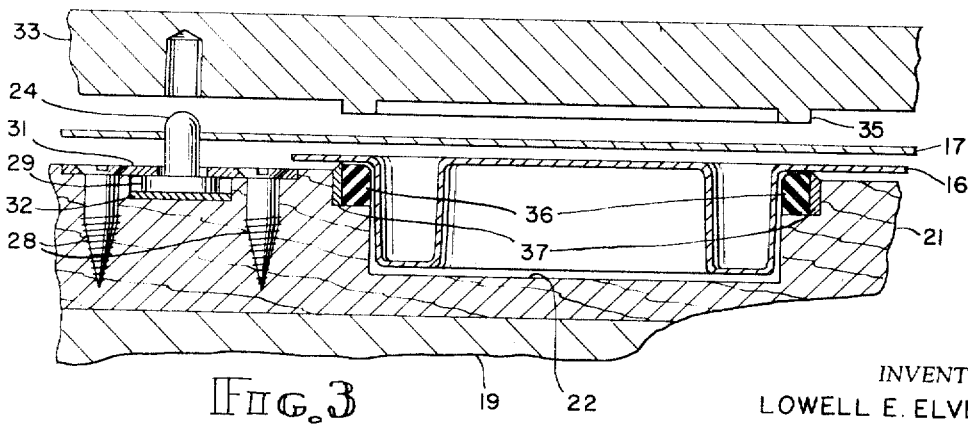
Fig. 3
INVENTOR.
LOWELL E. ELVER
BY Armin B. Pagel
ATTORNEY

United States Patent Office 3,347,733
Patented Oct. 17, 1967

3,347,733
APPARATUS FOR PRODUCING CONTAINERS
Lowell E. Elver, Janesville, Wis., assignor to The Parker Pen Company, Janesville, Wis., a corporation of Wisconsin
Filed Apr. 20, 1964, Ser. No. 361,150
4 Claims. (Cl. 156—515)

ABSTRACT OF THE DISCLOSURE

An apparatus for producing a container from a formed sheet plastic member and a paperboard card bearing printed indicia. A stationary plate supports the plastic sheet and includes a cavity for the formed portion thereof and an abutment for locating the card in oriented association with the plastic sheet, a heating platen is movable toward and away from the plastic sheet and card positioned on the stationary plate and has a raised portion that heats and compresses the card and plastic sheet outwardly of the stationary plate cavity, and a cut-off blade peripherally cuts the card and plastic sheet outwardly of the stationary plate cavity.

---

The present invention relates to packaging and more particularly to apparatus for producing packages comprising a formed sheet plastic member sealed to a paperboard card.

It is well known in the packaging art to produce containers comprising a member formed of sheet plastic material sealed to a paperboard card, such packages including so called blister packages in which an article is sealed between the plastic member and the card and also open-faced empty boxes which are later filled and provided with additional cover means. The plastic elements of such packages are conventionally formed either by vacuum or pressure forming means using a plurality of adjacent molds to produce a multitude of identical formed elements on a single sheet. Heretofore, after forming such elements, they have been individually severed from the surrounding waste plastic material, after which the individual formed plastic elements have been sealed to the paperboard material in a separate subsequent sealing operation. In addition to requiring a separate sealing operation and the handling of the individual plastic elements, this technique is also disadvantageous in that it is not possible, on a production basis, to register the plastic package elements with the paperboard cards with sufficient accuracy to provide a finished package in which the plastic portion overlies the entire adjacent portion of the card without one of the materials overlapping about the periphery of the finished package. For this reason, it is customary to cut the individual plastic elements somewhat smaller than the size of the paperboard cards, thereby sacrificing the aesthetic appearance of the finished package, to insure that the plastic material will not overlap the edges of the card.

A principal object of the present invention is to provide apparatus for forming containers of the above-mentioned type by registering a plurality of formed plastic areas on a single sheet of plastic material with predetermined corresponding areas on a paperboard sheet and, in a single operation, sealing the plastic and paperboard sheets together in selected areas and simultaneously severing both the plastic sheet and the paperboard card to separate the individual finished packages. Another object of the invention is to provide such an apparatus including means for adjusting the registration between the plastic and paperboard card. These and other important objects of the invention will be apparent by reference to the following prescriptions and the accompanying drawings in which:

FIGURE 1 is a perspective view of one form of open-faced box adapted to be produced in accordance with present invention;

FIGURE 2 is an exploded perspective view of an apparatus according to a preferred embodiment of the invention adapted simultaneously to seal and separate a plurality of packages of the general type shown in FIGURE 1;

FIGURE 3 is a partial cross-sectional view taken along lines 3—3 of FIGURE 2 with the apparatus in open condition; and FIGURE 4 is a perspective view showing another form of package adapted to be formed by means of the present invention and having an article sealed therein.

Referring to the drawings, the box 11 shown in FIGURE 1 comprises a transparent formed sheet plastic member 12 bonded to a paperboard card 13 to provide an open-faced tray-like container which may be provided with a lid, not shown, if desired. To adapt such a box to fabrication by heat sealing means, the paperboard material is of the type, well known in the packaging art, which is coated with a heat-responsive plasticizer or cement which bonds the card to the adjacent plastic surface under the influence of heat and pressure. As shown at 14, the card 13 may be provided with indicia visible through the transparent member 12 and protected thereby, and/or with indicia, as shown at 15 in FIGURE 2 printed on the bottom side of the card.

Rather than being formed one-at-a-time, the plastic members employed in such boxes are formed by a multiple mold which, by conventional pressure or vacuum forming techniques, simultaneously produces a plurality of spaced formed areas on a single sheet of plastic material 16 as shown in FIGURE 2. Heretofore, prior to sealing the plastic members thus formed to the paperboard cards, the individual formed areas of a sheet have first been severed from the surrounding waste plastic material, after which the discrete plastic members so produced have been individually sealed to the paperboard material in a subsequent operation.

In accordance with the present invention, the intermediate operation of severing individual members 12 from the formed sheet 16 is eliminated by simultaneously sealing areas of sheet 16 surrounding all of the formed areas to a large paperboard sheet 17 and, in the same operation, severing both the waste paperboard and waste plastic, to form individual boxes with perfectly aligned plastic and paperboard edge surfaces. This operation is accomplished by means of a combination sealing and cutting apparatus 18, one embodiment of which is shown in FIGURE 2.

The apparatus 18 comprises a stationary platen 19 supporting a cavity plate 21 which may be formed of wood, and in which are located a plurality of cavities 22 of the same size, shape and arrangement as the corresponding formed areas on the formed sheet 16, each cavity being adapted to receive and accurately support the corresponding formed area. In this connection, it should be noted that the cavity plate is produced to correspond to the formed sheets rather than to the similar mold used in forming the sheets, inasmuch as the formed sheets, although substantially identical to one another, do not correspond exactly to the mold due to shrinkage of the plastic material following the forming operation.

Each of the large paperboard sheets 17 is somewhat larger than the plastic sheets 16 and is provided with a pair of locating holes 26 and 27 adapted to receive snugly the corresponding locating pins 24 and 25 on the cavity plate, which are offset from the center line of the cavity plate, and are of different diameter, to insure that the sheet can be placed in the apparatus only in one mode of orientation. Since the cavity plate is formed to accurately receive the raised portions on the plastic sheet, there is generally no need for additional means to insure the proper orientation of the plastic sheet relative to the cavity plate, but means similar to those used for locating the paperboard card can also be employed to insure proper orientation of the plastic sheet if required.

The sheets 16 are preprinted with indicia 14 and/or 15 on either or both sides thereof, with the exact location of the indicia being established to correspond to the corresponding location of the formed areas of the plastic sheet 16 and to be in the same relation to holes 26 and 27 as the cavities are to the corresponding locating pins 24 and 25. This may be accomplished, for example, either by using pre-punched holes in the paperboard sheets to align the sheets in the printing press or by punching the holes in predetermined relation to the indicia printing means simultaneously with the printing operation. Thus, when each of the printed sheets is subsequently placed over the pins in the assembly apparatus, each indicia area is maintained in precise alignment with the corresponding formed area of the plastic sheet supported within the corresponding cavity. To compensate for any slight deviation between the relation of the holes to the printed indicia and the relation of the pins to the cavities, as may result from an error in correlating the printing apparatus with the sealing apparatus, pins 24 and 25 may be adjusted laterally by loosening screws 28 (FIGURE 3) which clamp the enlarged heads 29 of the locating pins between washers 31 and metal disks 32 in the cavity plate, shifting the pins and retightening the screws.

Located above the stationary platen 19 is a movable metal platen 33, which is maintained in vertical alignment with and is movable toward and away from the stationary platen by means illustrated schematically by air cylinder 34 as shown in FIGURE 3, which illustrates the movable platen near the bottom of its movement with a plastic sheet 16 and a paperboard sheet 17 positioned on the cavity plate as previously described. The movable metal platen 33 is provided with raised sealing ridges 35 adapted to contact the paperboard sheet in areas surrounding each of the formed areas of sheet 16. As previously mentioned, sheet 17 is coated on the surface adjacent the plastic member with a heat responsive plasticizer or cement. As is well known in the packaging art, the movable platen is heated, by means not shown, to a temperature such that the engagement of the sealing ridges with the back side of the paperboard sheet causes the coating on the opposite surface to bond the paperboard to the corresponding areas of the plastic sheet when the platen is moved to its extreme downward position in which the paperboard and plastic sheets are squeezed between the sealing ridges 35 and resilient members 36 aligned with the sealing ridges and supported in the cavity plate. Unlike previous heat sealing devices of the same general type, which require the use of previously severed discrete plastic box members, the cavity plate of the illustrated device is provided about each cavity with a continuous knife-like blade 37 adapted to cut through both the plastic and paperboard sheets as they are forced against the blade by the sealing ridges on the descending movable platen. Thus, as the sealing ridges on the descending platen locally heat and squeeze the paperboard and plastic sheets to provide a continuous seal about each formed area, the completed box is simultaneously severed from the surrounding waste material and requires no further sealing or severing operations. Upon completion of this single operation, the movable platen is raised and the waste material and the finished boxes are removed, with the apparatus then being ready to be reloaded for a new cycle. Obviously, additional means, not shown, may be employed to facilitate loading the machine and/or removing the finished boxes and waste material, to reduce or entirely eliminate the hand operations required in connection with the illustrated embodiment.

While the illustrated apparatus and the foregoing description relate to the production of an open-faced empty box, the same invention is also appropriate to the production of a container 38, as shown in FIGURE 4, in which an article 39 is sealed between a paperboard card 41 and a formed plastic member 42. Such a sealed container may be produced in a device substantially identical to the one shown simply by placing an article 38 in each of the formed areas of the plastic sheet after the sheet has been fitted into the cavity plate but before the paperboard card has been placed in the apparatus.

Since these and other modifications may be made without departing from the spirit of the invention, the foregoing description is to be considered as illustrative only, the scope of the invention being defined by the following claims.

I claim:

1. An apparatus for producing a container from a sheet of substantially flat thin plastic material with a raised box-like portion formed thereon and a paperboard card coated with a heat responsive bonding material and provided with printed indicia in a region bearing a predetermined relationship to at least one edge surface of said card, said apparatus comprising: a stationary cavity plate including wall means defining a cavity adapted to receive said raised box-like portion of said sheet and a substantially flat surface surrounding said cavity and adapted to engage the substantially flat portion of said sheet in an area surrounding said raised portion, card locating means associated with said cavity plate and bearing the same relationship to said cavity as said region bears to said edge surface, said locating means being engageable with said edge surface on said card when said card is adjacent said sheet with the raised portion thereof received in said cavity and with the coated surface of said card adjacent said sheet, whereby said card is located with said region in alignment with said raised box-like portion of said sheet, a movable heating platen, means for moving said movable heating platen toward and away from said cavity plate, said movable platen including a ridge disposed in alignment with said flat surface surrounding said cavity and adapted to engage said card so located to heat said card and squeeze said card and said sheet together against said surface as said movable platen is moved toward said cavity plate, thereby bonding said sheet and said card about said raised box-like portion, and a blade surrounding said cavity and spaced therefrom, said blade being adapted to sever both said sheet and said card along a common line as said sheet and said card are forced against said blade by said ridge.

2. An apparatus according to claim 1 in which said edge surface is defined by a hole formed in said paperboard card, said locating means comprising a pin adapted to fit snugly within said hole and being laterally fixed with relation to said cavity plate.

3. A construction according to claim 2 including means for laterally adjusting said pin.

4. An apparatus for simultaneously producing a plurality of containers from a sheet of substantially flat thin plastic material with a plurality of raised box-like portions formed thereon and a paperboard card coated with a heat responsive bonding material and provided with printed indicia in a plurality of regions, each of which corresponds in location to one of said raised box-like portions, said paperboard card being provided with two edge surfaces in predetermined relation to said indicia bearing regions, said apparatus comprising: a stationary cavity plate including wall means defining a plurality of cavities located in correspondence to the arrangement of said box-like portions on said sheet, each of said cavities being adapted to receive the corresponding box-like portion and having about its periphery a substantially flat surface adapted to engage the substantially flat portion of said sheet surrounding the corresponding raised portion, card locating means associated with said cavity plate and bearing the same relationship to said cavities as said regions bear to said edge surfaces, said locating means being engageable with said edge surfaces when said card is adjacent said sheet with the raised portions thereof received in the corresponding cavities, whereby said card is located with each of said regions in alignment with a corresponding raised portion of said sheet, a movable heating platen, means for moving said movable heating platen toward and away from said cavity plate, said movable platen including a plurality of continuous regions each of which is disposed in alignment with the flat surface surrounding a corresponding cavity and adapted to engage said card so located to heat said card and squeeze said card and said sheet together about the periphery of the corresponding raised portion against the corresponding flat surface as said movable platen is moved toward said cavity plate, thereby bonding said sheet and said card about each of the raised box-like portions, and a blade surrounding each of said cavities and spaced therefrom, each of said blades being adapted to sever both said sheet and said card along a common line surrounding said raised portion as said sheet and said card are forced against said blade by the corresponding ridge.

References Cited
UNITED STATES PATENTS

| | | | |
|---|---|---|---|
| 2,078,314 | 4/1937 | Busche | 53—373 |
| 2,293,696 | 8/1942 | Burchell | 156—267 |
| 3,047,991 | 8/1962 | Siegel et al. | 53—373 |

EARL M. BERGERT, *Primary Examiner.*

DOUGLAS J. DRUMMOND, *Examiner.*